April 1, 1958  A. J. HIRST  2,828,957
SUSPENSION SYSTEM FOR BOGIES OF RAILWAY AND LIKE VEHICLES
Filed Dec. 17, 1954  3 Sheets-Sheet 1

Inventor
Archie J. Hirst
By Ralph B. Stewart
attorney

April 1, 1958 A. J. HIRST 2,828,957
SUSPENSION SYSTEM FOR BOGIES OF RAILWAY AND LIKE VEHICLES
Filed Dec. 17, 1954 3 Sheets-Sheet 3

Inventor
Archie J. Hirst
By Ralph B. Stewart
Attorney

United States Patent Office 2,828,957
Patented Apr. 1, 1958

2,828,957

SUSPENSION SYSTEM FOR BOGIES OF RAILWAY AND LIKE VEHICLES

Archie John Hirst, Leicester, England, assignor to Metalastik Limited, Leicester, England, a corporation of Great Britain Application December 17, 1954, Serial No. 475,955

Claims priority, application Great Britain December 21, 1953

7 Claims. (Cl. 267—3)

This invention relates to resilient supports and more particularly but not exclusively to suspension systems for resiliently supporting railway and like vehicles.

Among the objects of the invention as applied to a railway vehicle is that of improving the standard of riding and reducing the demands of maintenance.

In our prior British patent specification No. 648,516 there is shown and described a rubber spring in which rubber units are bonded to metal plates alternating with the rubber in sandwich form. In use these interleaved rubber springs may be arranged either as simple shear mountings or as mountings stressed in combined shear and compression, the choice depending upon the characteristic required. One use of such interleaved rubber springs which was contemplated in that specification was for railway vehicle body mountings where they were arranged in opposition on the fore and aft faces of a loading member such as a body bolster so as to support the bolster resiliently from separated under-frame units such as to adjacent transoms on a suitable under-frame. In such uses it is convenient to employ two pairs of such springs, one pair near each end of the lateral bolster.

It was recognised in that specification that with a multiplication of the sandwich elements there could occur undue canting of the interconnecting metal plates out of parallelism with the end abutment surfaces of the spring. That invention sought to prevent canting by providing a tie between the interleaves in two springs arranged on opposite sides of the loading member. It may be said of that invention therefore that by the interconnecting tie the bending moment on the metal interleaf of a spring was neutralised. Developing the present invention from that concept it may be said that the present invention or at least its embodiment in a railway vehicle suspension system makes use of the bending moment rather than merely neutralising it.

The following description relates to the accompanying drawing which shows by way of example only one embodiment. In the drawing.

Figure 1:
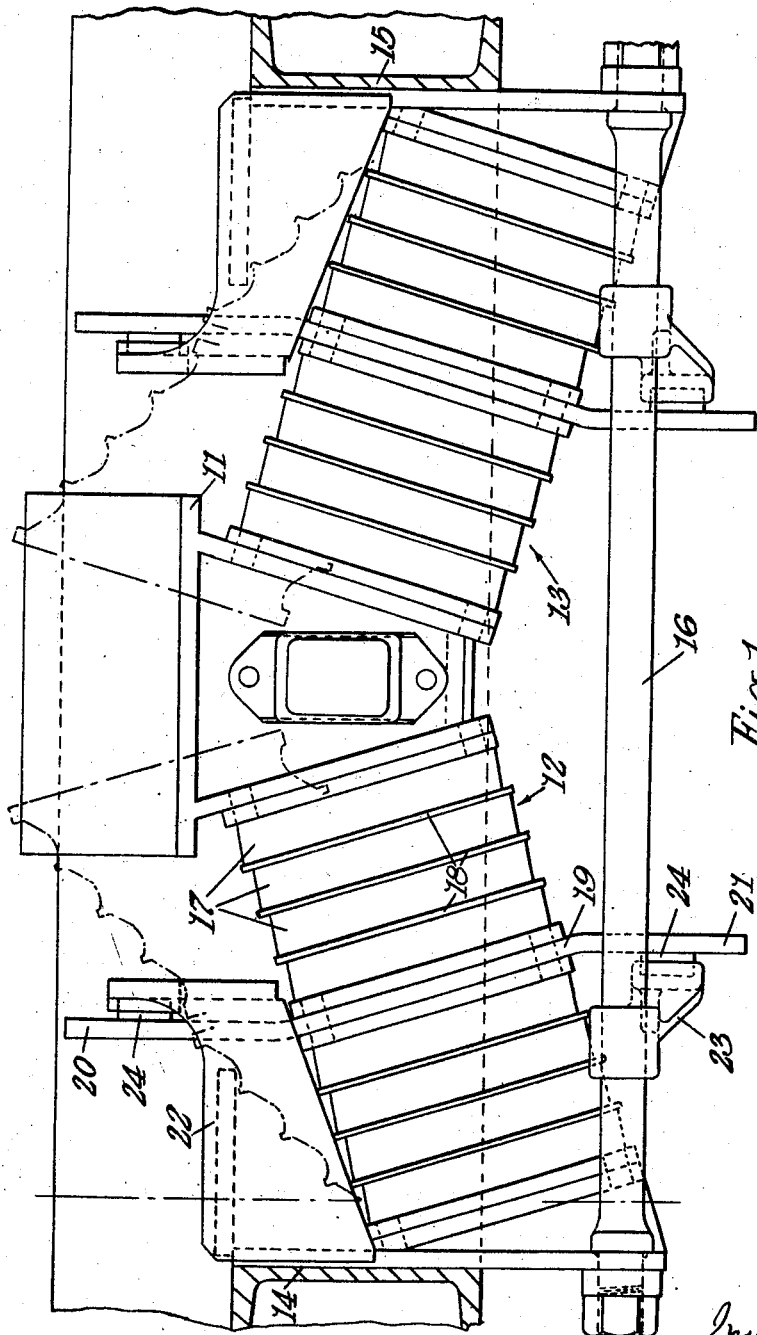
Figure 1 is a side view of a bolster mounting in accordance with the invention.
Figure 2:
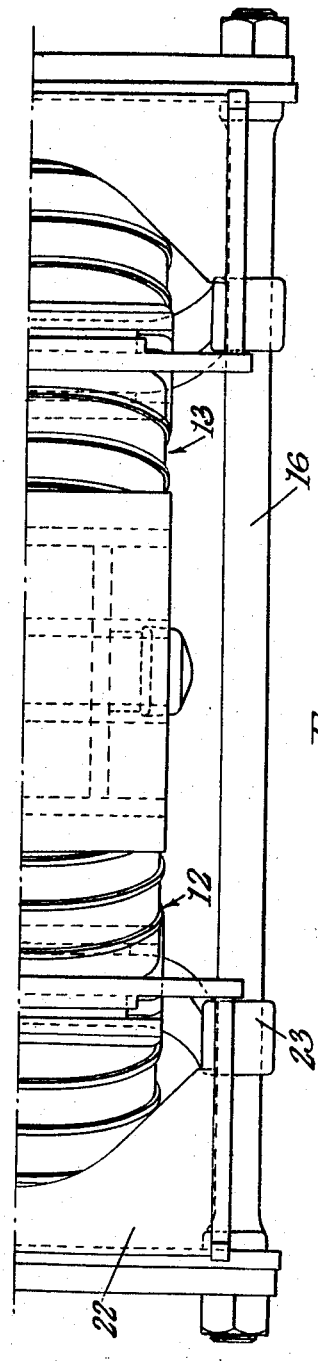
Figure 2 is a half plan view.
Figure 3:
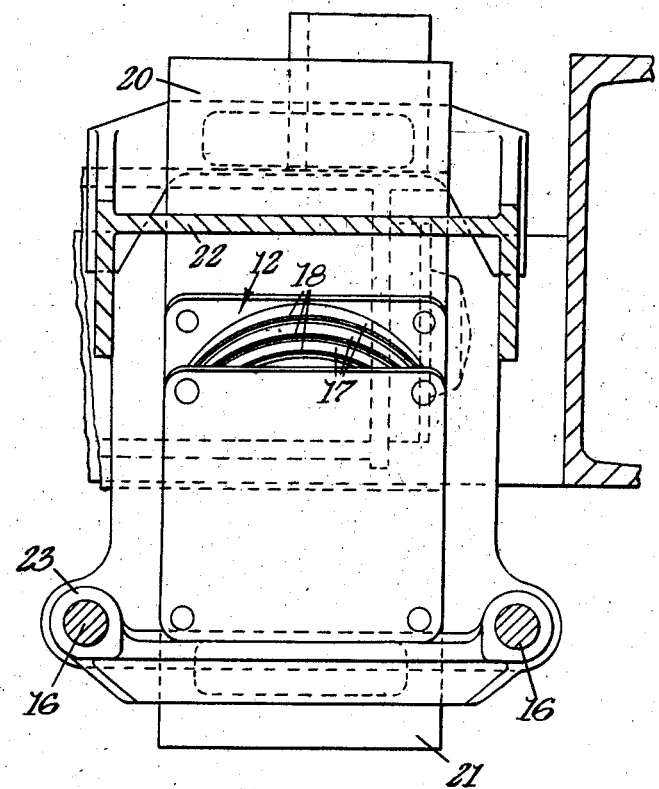
Figure 3 is a section on the line 3—3 of Figure 1.
Figure 4:
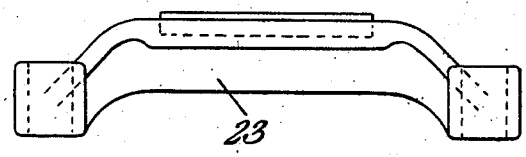
Figure 4 is a detail view showing the lower friction bracket.

In the drawing the bolster or loading member 11 is supported on the underframe, by two rubber sandwich springs 12 and 13 between two transoms 14 and 15 connected by tie bars 16, in the manner described and shown in our prior British patent specification No. 648,516. The rubber sandwich springs 12 and 13 are each of the kind consisting of pads of rubber 17 with metal interleaves 18 bonded to the rubber. At about the centre of each sandwich spring is provided a metal interleaf 19 which is bonded to adjacent pads 17 and which is substantially thicker than the other interleaves 18 and which has upward and downward extension 20 and 21 respectively. On fixed brackets 22 and 23 on the bogie frame there are pads of friction material 24 which engage the extensions 20 and 21 of the metal interleaf 19. The upper pad engages the extension 20 on the inner side, that is towards the bolster, whilst the lower pad engages the extension 21 on the outside.

The view shown in full detail in Figure 1 is that which the parts occupy when under normal load: there is also shown in outline and broken lines the disposition of the springs when free.

When the system is under load the interleaves, and in particular the interleaf 19 of each spring, are subjected to a bending moment, so that the interleaf 19 of the left hand spring in Figure 1 tends to move clockwise. This clockwise bending moment brings the extensions 20 and 21 on the interleaf firmly into engagement with the pads 24 of friction material; so that the interleaf cannot move until there occurs in the loading of the bolster a change in loading which is sufficient to overcome the frictional force.

A design in accordance with the invention, or at least the design as shown in the drawings, has among its advantages that damping is obtained without loss of bolster isolation. The inner half of each spring 12 and 13 is entirely free and undamped so that it can give an immediate response to the smallest vibration or shock. Its flexibility is not enough, however, to give the low frequency of large oscillations (the Railway Engineer's "long movement"), which is considered to promote passenger comfort. When the movement exceeds a certain amount such as $\frac{3}{16}''$ vertical and $\frac{1}{2}''$ horizontal, friction is overcome and the second element of the spring comes into play. There is no danger of large movement either high frequency or undamped.

A further advantage is the automatic maintenance of preloading; the intermediate plate moment is in fact a very soft spring for preloading the friction surface and compensates automatically for wear.

Yet a further advantage is the increase in fore and aft stiffness rate. The load on the friction surface in this design is more than would be removed by normal braking so that the inner section only gives a response and the stiffness is in effect double.

It will be understood, of course, that the invention may take other forms. Thus both friction pads might be placed below the spring and give a considerable transverse spacing. Both would then slide equally with vertical deflection of the bolster, but with transverse bolster swing they would not slide horizontally to an equal extent. There would be some twisting of the intermediate plate allowed by relative vertical movement of the two friction surfaces and this may be an advantage. With a particular proportion of transverse spacing of the friction pads to their vertical distance from the centre of the spring the friction force in the horizontal direction might have the same ratio to that in the vertical direction as the respective stiffnesses.

As above described with reference to the drawing, the frictional engagement between the extensions 20 and 21 of the metal interleaf 19 and the fixed brackets 22 and 23 on the bogie frame is effected by means of pads of friction material 24 on the said brackets 22 and 23. However it will sometimes be found preferable to have the upper pad on the bracket 22 as before, but the lower pad on the interleaf 19. The reason for this is as follows: in the case of the upper extension 20 engaging bracket 22, during sideways swing of the carriage on the bogie the friction pad 24 will move relatively to the extension 20 in the same direction as the centre of pressure moves; in the case of the lower extension 21 on the other hand, during this same sideways swing the centre of pressure will be displaced oppositely, and though one cannot arrange for the friction pad to move oppositely, at least one can avoid aggravating the misalignment by not displacing the pad at all, i. e., by mounting it on the interleaf.

The invention may be applicable to resilient mountings other than those for bogies of railway and like vehicles. It might be applicable, for instance, to the independent front wheel suspension system of a motor road vehicle.

It will be understood that the references throughout this specification to "rubber" are intended to include materials manifesting qualities like those of rubber, particularly the quality of resilience. It is further to be understood that the references in the specification and claims to "rubber pads" or "rubber blocks" are intended to include such blocks or pads which comprise a series of elements separated by interleaves and bonded to said interleaves.

What I claim is:

1. A resilient support comprising a first rubber block arranged to be loaded at least partly in shear between a supported part and a metal plate to which it is bonded and a second rubber block arranged to be loaded at least partly in shear between said metal plate to which it is bonded and a supporting part, and a friction pad between said metal plate and said supporting part arranged so that the pressure between the plate and supporting part increases with load on the supported part and so that slip occurs upon a sufficient load whereby loading is imposed upon said second block.

2. A resilient support comprising a support part, a supported part movable relative to said support part, a spring assembly between said parts, said assembly comprising a first rubber block, a rigid plate, and a second rubber block, said first rubber block being arranged between the supported part and the rigid plate so as to be free and externally undamped and capable of giving an immediate response to small vibrational movements of the supported part, and means providing a slipping connection between said plate and said support part whereby greater movement of the supported part causes said second block to come into use.

3. A resilient support comprising a frame structure, a load-applying member movable relative to the frame structure, a support member mounted on the frame structure and a spring assembly between the load applying member and the support member arranged to be subjected to a bending moment under load, said spring assembly comprising a pair of rubber blocks, one engaging the load-applying member and the other engaging the support member and a rigid plate sandwiched between the blocks and being movable with respect to said frame structure upon bending of said spring assembly, said plate having a portion thereof positioned to move into frictional engagement with a part of said frame structure with respect to which it slips under a sufficiently heavy load.

4. A resilient support comprising a frame structure, a load-applying member movable relative to the frame structure, a support member mounted on the frame structure and offset from the line of application of the load and a spring assembly arranged between the load-applying and the support member which is subjected to a bending moment under load, said spring assembly comprising a pair of rubber blocks, one engaging the load-applying member and the other engaging the support member, and a rigid plate sandwiched between the blocks and being movable with respect to said frame structure upon bending of said spring assembly, said plate having a portion thereof positioned to move into sliding frictional engagement with a part of said frame structure by said bending moment.

5. A resilient support comprising a frame structure, a load applying member movable relative to the frame structure, a support member mounted on the frame structure and a spring assembly between the load applying member and the support member and arranged to be subjected to a bending moment under load, said spring assembly comprising a pair of rubber blocks, one engaging the load-applying member and the other engaging the support member, a rigid plate sandwiched between the blocks, an extension of the rigid plate position to engage a portion of said frame structure and being urged into frictional engagement with said frame portion due to said bending moment.

6. A resilient support comprising a frame structure, a load-applying member movable relative to said frame structure, a support member mounted on the frame structure and a spring assembly arranged between the load applying member and the support member and arranged to be subjected to a bending moment under load, said spring assembly comprising a pair of rubber blocks, one engaging the load-applying member and the other engaging the support member, a rigid plate sandwiched between the blocks, an extension of the rigid plate, and a part carried by the frame structure and disposed between said extension and the load-applying member, said extension being urged into frictional engagement with said part due to said bending moment.

7. A resilient support comprising a frame structure, a load-applying member movable relative to said frame structure, a support member mounted on the frame structure and a spring assembly between the load applying member and the support member arranged to be subjected to a bending moment under load, said spring assembly comprising a pair of rubber blocks, one engaging the load-applying member and the other engaging the support member, a rigid plate between the blocks, a pair of extensions of the rigid plate spaced from one another in the direction of load application and arranged on opposite sides of the spring assembly, said extensions being urged into sliding frictional engagement with portions of said frame structure due to said bending moment.

References Cited in the file of this patent

UNITED STATES PATENTS

| 1,538,737 | O'Flynn | May 19, 1925 |
| 2,295,554 | Cottrell | Sept. 15, 1942 |
| 2,352,030 | Sproul | June 20, 1944 |
| 2,603,479 | Olander | July 15, 1952 |
| 2,606,018 | Olander | Aug. 5, 1952 |
| 2,688,479 | Barbera | Sept. 7, 1954 |

FOREIGN PATENTS

| 648,516 | Great Britain | Jan. 3, 1951 |